United States Patent
Devries et al.

(10) Patent No.: US 10,452,116 B1
(45) Date of Patent: *Oct. 22, 2019

(54) DETERMINING A DEVICE STATE BASED ON USER PRESENCE DETECTION

(71) Applicant: Amazon Technologies, Inc., Seattle, WA (US)

(72) Inventors: David William Devries, San Jose, CA (US); Stewart Robin Shearer, San Jose, CA (US); Amit Singh Chhetri, Santa Clara, CA (US); Serkan Hatipoglu, Santa Clara, CA (US); Omar Sze Leung, Palo Alto, CA (US); Michael Serge Devyver, Palo Alto, CA (US); Leo Benedict Baldwin, San Jose, CA (US); Noam Sorek, Zichron Yaccov (IL)

(73) Assignee: Amazon Technologies, Inc., Seattle, WA (US)

( * ) Notice: Subject to any disclaimer, the term of this patent is extended or adjusted under 35 U.S.C. 154(b) by 71 days.

This patent is subject to a terminal disclaimer.

(21) Appl. No.: 15/620,782

(22) Filed: Jun. 12, 2017

Related U.S. Application Data

(63) Continuation of application No. 14/859,008, filed on Sep. 18, 2015, now Pat. No. 9,678,559.

(51) Int. Cl.
*G06F 1/32*      (2019.01)
*G06F 3/041*     (2006.01)
*G01P 15/09*     (2006.01)
*G06F 1/3231*    (2019.01)
*G06F 3/16*      (2006.01)
(Continued)

(52) U.S. Cl.
CPC .......... *G06F 1/3231* (2013.01); *G01P 15/097* (2013.01); *G06F 1/3287* (2013.01); *G06F 3/0416* (2013.01); *G06F 3/16* (2013.01)

(58) Field of Classification Search
CPC .... G06F 1/3231; G06F 1/3287; G06F 3/0416; G06F 3/16; G01P 15/097
See application file for complete search history.

(56) References Cited

U.S. PATENT DOCUMENTS

| | | | | |
|---|---|---|---|---|
| 7,117,380 B2* | 10/2006 | Kangas | .................. | G06F 1/3203 713/320 |
| 8,884,896 B2* | 11/2014 | Tabone | .................. | G06F 1/3231 345/173 |

(Continued)

*Primary Examiner* — Stefan Stoynov
(74) *Attorney, Agent, or Firm* — Eversheds Sutherland (US) LLP

(57) ABSTRACT

A decision engine executing on an electronic device may determine, using sensor data captured by multiple sensors of the device, whether a user is present in an environment that includes the device. If the user is determined to be present in the environment, the device may transition from a first state to a second state. The first state may be a first power state of the device in which the device is powered off or an idle or dormant state in which the device is powered on but a display of the device is powered off. Correspondingly, the second state may be a second power state of the device in which the device and the display are powered on and content is being rendered on the display. If the decision engine cannot make a determination based on the sensor data, a context engine may adjudicate the user presence determination.

20 Claims, 6 Drawing Sheets

(51) Int. Cl.
*G01P 15/097* (2006.01)
*G06F 1/3287* (2019.01)

(56) References Cited

U.S. PATENT DOCUMENTS

2012/0032894 A1* 2/2012 Parivar ................ G06F 1/3215
 345/173
2012/0287031 A1* 11/2012 Valko ...................... G09G 5/00
 345/156

* cited by examiner

DETERMINING A DEVICE STATE BASED ON USER PRESENCE DETECTION

CROSS REFERENCE TO RELATED APPLICATION(S)

This application is a continuation of U.S. application Ser. No. 14/859,008, filed Sep. 18, 2015, the disclosure of which is incorporated herein by reference in its entirety.

BACKGROUND

Mobile computing devices such as smartphones or tablets may include electronic displays capable of rendering a variety of types of content. These existing devices may be designed to primarily enable touch-based user interactions. New devices, such as those that are designed for voice-based user interaction or other user interaction that may occur when a user is separated from the device by a distance that makes touch-based interaction infeasible, introduce new challenges for enabling such user interaction, some technical solutions to which are discussed herein.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral identifies the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Figure 1:
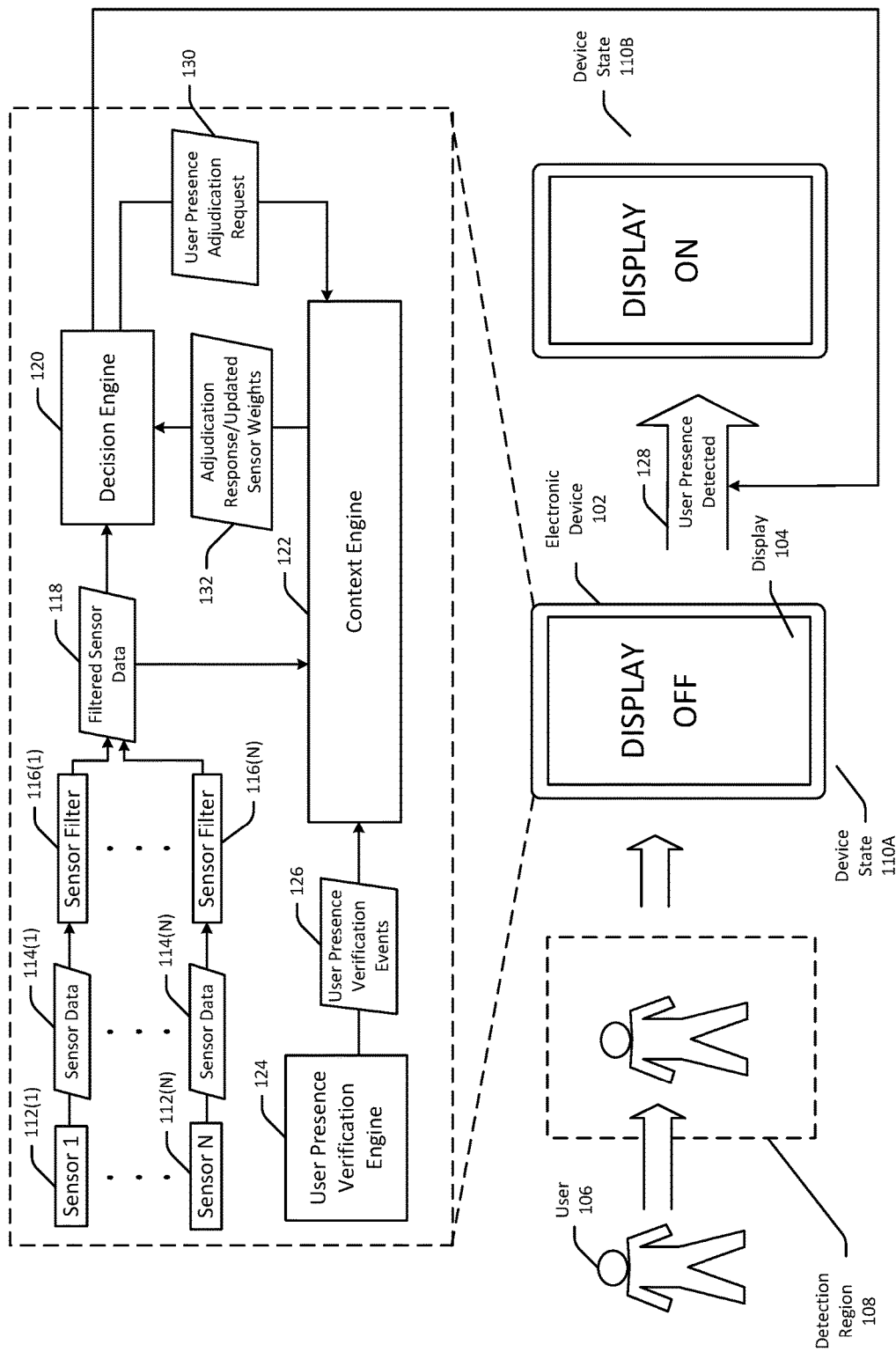
FIG. 1 is a schematic diagram illustrating user presence detection in an environment around an electronic device using sensor data captured by a variety of sensors and transitioning the device from a first state to a second state based on the detected user presence in accordance with one or more example embodiments of the disclosure.

This disclosure relates to, among other things, systems, devices, methods, and computer-readable media for determining, using sensor data captured by multiple sensors of an electronic device, whether a user is present in an environment that includes the electronic device, and if the user is determined to be present in the environment, transitioning the electronic device from a first state to a second state or maintaining a current state of the electronic device. The first and second device states may be different power states of the device. For example, the first state may be a device power state in which the electronic device is powered off or an idle or dormant state in which the electronic device is powered on but a display of the electronic device is powered off. Correspondingly, the second state may be a device power state in which the electronic device and the display are powered on and content is being rendered on the display.

Alternatively, the first and second states may be different operational/user modes of the electronic device. For example, the first state may be an operational/user mode in which a minimal amount of content is rendered on the display of the electronic device (e.g., a current date and/or time) and the second state may be an operational/user mode in which an increased amount of content (e.g., content specific to a particular user profile, content associated with a group of user profiles or a shared user profile, etc.) is rendered on the display. It should be appreciated that a device may also transition states or maintain a current state if a user is determined to be absent from the environment. Further, in certain example embodiments, a default device state may be established if certain predetermined criteria are met (e.g., sensor data from a threshold number of sensors satisfies or fails to satisfy corresponding threshold values). As described herein, in certain example embodiments, a value may satisfy a threshold value if the value is greater than or equal to the threshold value. In other example embodiments, a value may satisfy a threshold value if the value is less than or equal to the threshold value.

An electronic device in accordance with example embodiments of the disclosure may include a variety of types of sensors. Such sensors may include, without limitation, a touch sensor (e.g., capacitive and/or resistive) configured to detect touch events at a display of the electronic device; a vibration sensor (e.g., an accelerometer); an acoustic sensor (e.g., a microphone), a temperature sensor such as an infrared (IR) sensor (e.g., a passive IR (PIR) sensor); an image sensor (e.g., a camera); an antenna capable of receiving/transmitting radio frequency (RF) signals (e.g., a WiFi antenna, a Bluetooth antenna, etc.); a motion sensor; an ambient light sensor; and so forth.

The sensors may include sparse sensors as well as rich sensors. A sparse sensor may be a lower power, lower latency sensor than a rich sensor and may be capable of sensing a more limited number or range of inputs than a rich sensor. Conversely, a rich sensor may be a higher power, higher latency sensor than a sparse sensor and may be capable of sensing a greater number or range of inputs than a sparse sensor. An accelerometer may be an example of a sparse sensor that has lower power requirements and a lower latency associated with activation than a rich sensor such as a camera. In certain example embodiments, a sparse sensor may have a broader coverage range than a rich sensor. For example, an accelerometer may have a full 360 degree coverage range while a camera may have a smaller coverage range as a result of a narrower field-of-view. As will be described in more detail later in this disclosure, a sparse sensor having a lower confidence value associated therewith may trigger activation of a rich sensor having a higher confidence value. Any number of sensors may be sequentially activated in this manner.

In accordance with example embodiments of the disclosure, the electronic device may include a touch-panel display configured to detect touch-based user interactions with the display. The display may be, without limitation, a liquid-crystal display (LCD); an electrophoretic display; an organic light-emitting diode (OLED) display; an electrowetting display; or the like. The electronic device may also enable voice-based interactions. For example, the electronic device may be configured to receive audio data, perform natural language processing on the audio data, determine data corresponding to the processed audio data, and output the determined data via, for example, a speaker of the device. In certain example embodiments, a service executing on a remote server may perform the natural language processing, determine the corresponding data, and send the corresponding data to the electronic device for output via the device. The electronic device may make a call to the service after determining that audio input data received at the device is indicative of a trigger word or phrase.

In certain example embodiments, the electronic device may be designed for non-handheld interaction. For example, the device may be placed on a surface such as a table surface in a residential room, a kitchen counter, or the like. Further, the device may be configured to transition to a different device state (e.g., device power state, operational/user mode, etc.) when user presence is detected in a detection region. The detection region may be a portion of an environment that includes the device and that is within a detectable range of one or more sensors of the device.

In certain example embodiments, the various sensors of the device may sense conditions within the detection region and generate sensor data indicative of the sensed conditions. More specifically, each sensor of the device may be configured to sense a particular type or range of inputs and generate sensor data indicative of one or more characteristics of the sensed input(s) such as, for example, a frequency, amplitude, phase, or the like of a detected analog signal. In an example embodiment, an IR sensor may detect electromagnetic (EM) radiation in the IR portion of the EM spectrum. In another example embodiment, an accelerometer may detect vibrations that propagate through a propagation medium in the detection region such as a floor surface. In another example embodiment, an ambient light sensor may detect an intensity of ambient light in the detection region. In another example embodiment, an antenna may detect WiFi and/or Bluetooth RF signals and a radio of the electronic device may convert the received signals to an electrical current or voltage. A received signal strength indicator (RSSI), which provides a measure of the power of a received RF signal, may be determined from the electrical current or voltage. In another example embodiment, a camera may capture images of the detection region within its field-of-view at any suitable frame rate. In another example embodiment, an acoustic sensor such as a microphone may detect acoustic vibrations such as those produced by various audible sounds present in the detection region. It should be appreciated that the above examples of sensors that may be incorporated into the electronic device and used to capture sensor data indicative of various inputs present in the detection region are merely illustrative and not exhaustive.

In certain example embodiments, a combination of sensor data captured by multiple sensors of the electronic device may be used to determine user presence in or user absence from the detection region. The multiple sensors may include a combination of sparse and rich sensors. By applying sensor fusion techniques, a sensor data signature may be generated from sensor data captured by multiple sensors and the generated sensor data signature may be evaluated against one or more stored sensor data signatures known to be indicative of user presence in the detection region or user absence from the detection region. By utilizing sensor data captured from multiple different types of sensors, a more accurate determination of user presence in the detection region may be obtained. For example, a camera of the electronic device may capture images of non-human moving objects through windows or from reflections or moving shadows. By augmenting the images captured by the camera with sensor data captured by an acoustic sensor, an RF sensor, an accelerometer, or the like, images captured by the camera may be validated or ruled out as being indicative of user presence in the detection region.

In certain example embodiments, an electronic device may include a decision engine that may be configured to determine a sensor data signature from real-time sensor data captured by various sensors and evaluate the sensor data signature against one or more stored sensor data signatures to make a determination as to whether a human user is present in an environment around the device (e.g., a detection region). More particularly, the decision engine may include a set of computer-executable instructions for performing a lookup of a sensor data signature generated from real-time sensor data in a lookup table of stored sensor data signatures. Each stored sensor data signature may include sensor data captured over a period of time prior to the period of time over which the real-time sensor data is received. Further, each stored sensor data signature may be stored in association with an indication of a corresponding device state. Accordingly, if the decision engine locates a matching stored sensor data signature in the lookup table, the device state that corresponds to the matching sensor data signature may be established or maintained on the electronic device. Alternatively, each stored sensor data signature may be stored in association with an indication of a corresponding user presence or user absence determination. The electronic device may then determine a device state having a predefined association with the user presence or user absence determination and may establish or maintain that device state.

The sensor data signature that the decision engine generates from the real-time sensor data may be, for example, a collection of sensor data values sampled from the sensor data captured by each of multiple sensors of the electronic device over a period of time during which the real-time sensor data is received. Similarly, each stored sensor data signature may be, for example, a collection of sensor data values sampled from sensor data captured over a respective period of time prior to the period of time over which the real-time sensor data is received. Alternatively, each sensor data signature may be a collection of continuous variables, where each continuous variable represents an analog signal sensed by a particular sensor over a period of time.

In certain example embodiments, the sensor data signature may be represented as a covariance matrix where an element at the i, j position in the matrix represents the covariance between respective sets of sensor data values corresponding to different sensors. Similarly, each stored sensor data signature may be represented using a corresponding covariance matrix. As previously described, the decision engine may compare the sensor data signature generated from real-time sensor data to various stored sensor data signatures to determine if the real-time sensor data signature matches a stored sensor data signature. In certain example embodiments, this may involve determining whether a covariance matrix representative of the real-time sensor data signature is equivalent (or within some threshold tolerance) of the covariance matrix representative of a stored sensor data signature. Any suitable statistical test for determining whether covariance matrices are equal or within a threshold tolerance of one another may be used. It should be appreciated that a covariance matrix is merely an example data structure that can be used to represent a sensor data signature. More generally, in certain example embodiments, the decision engine may determine whether a real-time sensor data signature matches a stored sensor data signature by comparing a variance of sensor data values in the real-time sensor data signature to a variance of a stored sensor data signature to determine if the variances are equal or within a threshold tolerance of each other. If the variances are equal or within a threshold tolerance of each other, a user presence or user absence determination having a predefined association with the stored sensor data signature may be determined and a device state corresponding to the user presence or user absence determination may be established or maintained on the electronic device.

In certain example embodiments, a stored sensor data signature may be representative of historical sensor data captured by sensors of the device over a period of time that occurred prior to a period of time over which the real-time sensor data is captured. One or more user presence verification events may have been determined to be present or absent during at least a portion of the time period over which the historical sensor data was captured. Based on the presence or absence of such user presence verification event(s), the stored sensor data signature representative of the historical sensor data may be determined to be associated with user presence in or user absence from the detection region. For example, certain user presence verification events such as a touch event on a display of the electronic device, receipt of audio data at the device that contains a trigger word or phrase, etc. may constitute definitive indications of user presence. If such events are detected during at least a portion of a time period over which historical sensor data is captured, the corresponding sensor data signature for the historical sensor data may be stored in association with an indication of user presence. As such, if a match is detected between the sensor data signature generated from the real-time captured sensor data and the stored sensor signature, the decision engine may determine that a user is present in the detection region based on this stored association and a corresponding device state may be established or maintained on the device.

In addition, as will be described in more detail below, an electronic device in accordance with example embodiments of the disclosure may also include a context engine that may include a set of computer-executable instructions for analyzing historical sensor data captured over various periods of time and generating corresponding historical sensor data signatures (interchangeably referred to herein as stored sensor data signatures). A period of time over which historical sensor data used to generate a historical sensor data signature is captured may be longer than a period of time over which real-time sensor data used to generate a real-time sensor data signature is captured. In particular, the context engine may assess sensor data received over a longer period of time as compared to a period of time over which the decision engine evaluates sensor data, and thus, is aware of a larger set of past events and actions associated with the device (e.g., user verification events), thereby making the context engine better equipped to correlate particular patterns of sensor data with user presence in or user absence from the detection region.

The context engine may also include a set of computer-executable instructions for determining weighting factors (interchangeably referred to herein as weights) to be applied to sensor data captured by different sensors. In certain example embodiments, the context engine may determine a weight to be applied to sensor data captured by a particular sensor based on known information about a detection region in which an electronic device is located. For example, the context engine may determine a physical address associated with the electronic device. The address may be stored as part of a user profile with which the electronic device is registered. In other example embodiments, the context engine may determine the device's location from satellite signals received by a receiver of the device (e.g., a Global Positioning System (GPS) receiver). The context engine may then access information from, for example, third-party databases that indicates characteristics associated with the address that may impact inputs that are sensed within the detection region.

For example, the context engine may determine that the address is associated with a primarily concrete structure. Because vibrations (such as those produced by human footsteps) may not propagate as readily through concrete as through wood for example, data captured by an accelerometer of the device may be weighted up in relation to sensor data captured by other sensors to order to decrease the likelihood that a determination is made that a user is absent from the detection region even though data generated by the accelerometer may in reality be the result of user presence in the detection region. More specifically, the context engine may provide the weight to be applied to the accelerometer data to the decision engine, which may, in turn, multiply the weight by sensor data values of the accelerometer data when generating the real-time sensor data signature.

As another example, the context engine may evaluate historical sensor data captured by a microphone of the device to determine a baseline level of ambient noise that is present even when no user is present in the detection region. The context engine may then determine a weight to be applied to real-time sensor data captured by the microphone based on the baseline level of ambient noise and may provide the decision engine with the determined weight. For example, the decision engine may weight down real-time audio data captured by the microphone such that only that portion of the audio data that exceeds the baseline level of ambient noise is used to generate the real-time sensor data signature. For example, if 10 dB of ambient noise is typically present in the detection region, 30 dB of real-time audio data captured by the microphone may be weighted down to 20 dB.

In other example embodiments, real-time sensor data captured by a particular sensor may be weighted up or weighted down based on whether historical sensor data captured by the particular sensor is correlated to one or more user presence verification events. For example, the context engine may determine that historical sensor data captured by an accelerometer of the electronic device and representative of bulk-acoustic vibrations present in the detection region is historically followed by a user presence verification event such as a touch event on a display of the device, detection of a wake word or phrase by a microphone of the device, detection of a human figure by a camera of the device, etc. In such example embodiments, the context engine may provide the decision engine with a weight to be applied by the decision engine to real-time sensor data from the accelerometer that causes the accelerometer data to be weighted more heavily than sensor data from other sensor(s). In this manner, even if sensor data from other sensor(s) does not indicate user presence in the detection region (e.g., a human figure is not in the field-of-view of a camera of the device, no audio data indicative of human speech is detected at a microphone of the device, etc.), a determination of user presence in the detection region may nonetheless be made based on the weighted accelerometer data.

In certain example embodiments, sensor data captured by a particular sensor may only be weighted up if the sensor data exhibits characteristics associated with human presence in the detection region. For example, accelerometer data that is representative of human footsteps may have a characteristic frequency and/or phase, may exhibit characteristic changes in amplitude, etc., in which case, the decision engine may weight up such accelerometer data. On the other hand, accelerometer data that does not exhibit characteristics associated with human presence or that exhibits characteristics associated with non-human vibrations (e.g., machine vibrations) may be weighted down or not weighted at all.

In certain example embodiments, the context engine may also apply the weights that it provides to the decision engine to the stored historical sensor data signatures. For example, if historical sensor data captured by a particular sensor (e.g., a microphone) is captured over a time period that also includes a user presence verification event, the context engine may weight up the historical sensor data from that sensor that is included in a corresponding historical sensor data signature (e.g., multiply a weighting factor by sensor data values in the historical sensor data signature that correspond to the historical sensor data captured by that sensor). In addition, the context engine may update weights applied to sensor data captured by various sensors as additional historical sensor data becomes available. For example, the context engine may determine that additional historical sensor data captured by a particular sensor is not correlated with a user presence verification event where prior historical sensor data from the particular sensor was correlated with a user presence verification event. In such an example embodiment, the context engine may lower (or remove altogether) the weight applied sensor data captured by that sensor.

In addition, in certain example embodiments, the context engine may assign a greater weight to sensor data captured by a sensor that is deemed to be more reliable to sensing user presence than to sensor data captured by a sensor deemed to be less reliable. For example, image data captured by a camera may be deemed more indicative of user presence or user absence from the detection region than accelerometer data, in which case, the image data may be weighted more heavily than the accelerometer data.

Further, in certain example embodiments, if a change in a location of the device is detected based on a change in location coordinates associated with signals received by a GPS receiver, the context engine may be configured to adjust the weights associated with the various sensors of the device. For example, if it is determined that the device has moved from a primarily wood construction building to a primarily concrete construction building, a weight associated with a vibration sensor (e.g., an accelerometer) may be adjusted (e.g., increased or decreased). As another example, if it is determined that the device has moved from a single-family home to an apartment that may be associated with greater ambient noise levels, the weight associated with an acoustic sensor (e.g., a microphone) may be decreased to reduce to the extent to which sensor data captured by the acoustic sensor contributes to a sensor data signature containing the combined sensor output of multiple sensors including the acoustic sensor.

In certain example embodiments, a weight may be a numerical quantity that is applied to sensor data captured by a sensor. For example, one or more sensor data values may be multiplied by the weight. In other example embodiments, binary 2-level weights may be used to deactivate a sensor that is generating sensor data is excessively noisy (e.g., a noise level of the sensor data exceeds a threshold value). In still other example embodiments, non-linear weighting curves that may include discontinuities, non-monotonic functions, or the like may be used weight sensor data.

In certain example embodiments, the sensor data received from any given sensor of an electronic device may be filtered using a low-pass filter, a band-pass filter, a high-pass filter, or the like to remove noise and obtain filtered sensor data that constitutes a useful input for determining user presence in or user absence from the detection region. For example, a detection filter may be applied to audio data captured by a microphone to determine a type of sound indicated by the audio data, repetition characteristics of the audio data (e.g., whether the audio data includes a single sound or a series of repeated sounds), etc. As another non-limiting example, Doppler filtering may be applied to audio data captured by an array of microphones to identify slow, quite human movements such as those generated by a seated person.

The decision engine may then apply a respective weighting factor to corresponding filtered sensor data from each of one or more sensors to obtain respective weighted filtered sensor data for each of the one or more sensors. The decision engine may receive the weights from the context engine as described earlier. It should be appreciated that sensor data from only certain sensors may be weighted. The decision engine may then generate a real-time sensor data signature from the filtered real-time sensor data captured by each sensor. At least a portion of the filtered sensor data values used to generate the real-time sensor data signature may be multiplied by a weight that either increases or decreases the relative impact of the weighted sensor data values on a user presence or user absence determination in relation to non-weighted sensor data values. As previously described, the real-time sensor data signature may be represented by a data structure such as a covariance matrix generated from the sensor data values.

The decision engine may then determine whether the real-time sensor data signature matches a stored historical sensor data signature. For example, the decision engine may determine whether a covariance matrix representative of the real-time sensor data signature is equivalent to or within a threshold tolerance of a covariance matrix representative of a stored historical sensor data signature. If the decision engine determines that a real-time sensor data signature matches a stored sensor data signature that is associated with a user presence determination, the decision engine may determine that the real-time sensor data signature is indicative of user presence in the detection region. In response to such a determination, the electronic device may transition from a first device state to a second device state. For example, the device may transition from a first low-power device state to a second higher-power device state. As previously noted, the first low-power state may be a device state in which the electronic device is powered off or an idle or dormant state in which the electronic device is powered on but a display of the electronic device is powered off. Correspondingly, the second higher-power device state may be a device state in which the electronic device and the display are powered on and content is being rendered on the display such as, for example, a home screen containing customizable content. In certain example embodiments, if the electronic device is already in the higher-power device state, that device state may be maintained in response to a user presence determination. For example, by using sensor data from multiple sensors (e.g., an accelerometer, an array of microphones, etc.), and not simply from a motion sensor, camera, or the like, the device may be configured to remain in the higher-power device state (e.g., a state in which the display is powered on) when a user is present in the room but not in motion or only making small movements (e.g., a seated person). The electronic device may be configured to detect, at a desired confidence level (e.g., 95%), human presence within a threshold period of time (e.g., 300 ms) from when a user is actually present in the detection region. Further, in certain example embodiments, the device may be biased towards false positive detection to minimize scenarios in which the device fails to transition states (e.g., power on the display) when a user is present in the detection region despite the possibility, in some cases, of transitioning states even when a user is not present in the detection region.

Similarly, in certain example embodiments, the device may be configured to transition states (e.g., transition from a higher-power device state to the lower-power device state) in response to a user absence determination (e.g., a determination that a real-time sensor data signature generated from the combined sensor output of multiple sensors matches a stored historical sensor data signature that is associated with a determination that a user is not present in the detection region). For example, the device may be configured to transition from a device state in which the display is powered on to one in which the display is powered off but the device is still powered on in response to a combined sensor output indicative of user absence over a threshold period of time (e.g., a timeout period). The device may further transition to even lower-power device states (e.g., a sleep state, a state in device is completely powered off, etc.) after additional timeout periods elapse. Such timeout periods may be user-configurable.

In certain example embodiments, the decision engine may not be able to make a determination as to user presence in or user absence from the detection region based on the sensor output from a particular combination of sensors. In such example embodiments, the device may activate one or more sensors not included among the particular combination of sensors and utilize sensor data captured by the one or more activated sensors in combination with the sensor output from the particular combination of sensors to make a determination regarding user presence in or user absence from the detection region. In an example scenario, the decision engine may not be able to make a determination regarding user presence in the detection region based on sensor data captured by microphone and sensor data captured by an accelerometer. For example, the sensor data captured by the microphone may conflict with the sensor data captured by the accelerometer. The sensor data from the accelerometer may be representative of vibrations in the detection region that may be indicative of human footsteps while the sensor data from the microphone may indicate the absence of audible speech. In such an example scenario, the device may activate a camera of the device to capture one or more image frames of the detection region. The decision engine may then confirm or rule out user presence in the detection region based on whether a user is detected in the image data captured by the camera. In this manner, the decision engine may use the image data captured by the camera to resolve the conflict between the sensor data captured by the microphone and the sensor data captured by the accelerometer. It should be appreciated that the one or more sensors (e.g., the camera) not included in the particular combination of sensors mentioned above (e.g., the microphone and the accelerometer) may already be active and capturing sensor data and may not need to be activated, in which case, the sensor data being captured by these additional sensor(s) may be used to resolve the conflict.

In certain example embodiments in which the decision engine is unable to make a determination regarding user presence in the detection region based on the real-time sensor data signature generated from the real-time sensor output, the decision engine may send a user presence adjudication request to the context engine. Such example embodiments may involve the receipt of conflicting sensor data as described above. Such example embodiments may also include embodiments in which the real-time sensor data signature does not match any stored historical sensor data signature.

In still other example embodiments, the decision engine may be unable to make a determination regarding user presence if each of the sensors of the electronic device (or some threshold number of sensors) is generating sensor data indicating high levels of sensed inputs in the detection region (e.g., a level above a threshold value). An example scenario in which this may occur is when a high-occupancy state is associated with the detection region (e.g., a large group of people are present in the detection region). In such an example scenario, the sensor data may indicate the presence of a large number of people. For example, the sensor data may include accelerometer data that indicates a large number or intensity of vibrations, microphone data that indicates high decibel levels and/or a large number of different audible frequency ranges, image data captured by a camera that includes multiple persons, RF signal data that indicates the presence of multiple user devices in the detection region, and so forth.

In yet other example embodiments, the decision engine may be unable to make a determination regarding user presence if each of the sensors of the electronic device (or some threshold number of sensors) is generating sensor data indicating very low levels of sensed inputs in the detection region. For example, if the detection region is typically a quiet environment, the decision engine may be unable to determine whether sensor data indicating low levels of sensed inputs in the detection region (that are nonetheless higher than the expected levels of sensed inputs when no user is present in the detection region) indicates human presence in the detection region or is the result of a non-human anomaly (e.g., vibration from a washing machine).

After sending the user presence adjudication request to the context engine, the decision engine may receive a user presence adjudication response from the context engine. In particular, the context engine may receive the real-time sensor data captured by the sensors of the electronic device and make a default determination regarding whether to transition a power state of the device. This default determination may be indicated in the user presence adjudication response. For example, in the scenario in which the sensor data indicates very high levels of sensed inputs, the context engine may make a determination that the display of the device should be powered off or should remain powered off if already in that state. This determination may be predetermined based on the assumption that sensor data indicating very high levels of sensed inputs is likely to reflect a scenario in which a large number of users are present in the detection region, thereby making interaction between a specific user and the device less likely. On the other hand, in those example embodiments in which the sensor data indicates low levels of sensed inputs that are nonetheless higher than expected levels, the context engine may make a default determination that the display is to be powered on (or remain powered on) to bias towards false positive detection. It should be appreciated that these default determinations may be reversed.

In other example embodiments, the context engine may access stored historical sensor data (e.g., stored sensor data signatures) that spans a prior and longer period of time than stored sensor data signatures to which the decision engine has access. In such example embodiments, the context engine may be able to determine a matching stored sensor data signature for the real-time sensor data when the decision engine cannot. The matching stored sensor data signature identified by the context engine may have a predefined association with a user presence or user absence determination. As previously described, one or more user presence verification events may be used to identify the user presence or user absence determination to associate with a stored sensor data signature.

In certain example embodiments, the user presence adjudication response may include one or more updated weights in addition to or in lieu of an indication of a user presence or user absence determination. The context engine may determine the updated weights as additional historical sensor data and additional user presence verification data indicative of additional user presence verification event(s) is collected. In certain example embodiments, the user presence adjudication response may include the updated weights in lieu of a user absence or user absence determination, in which case, the decision engine may apply the updated weights to the real-time filtered sensor data to arrive at an appropriate determination regarding user presence. In other example embodiments, the user presence adjudication response may include the updated weights in addition to the user presence or user absence determination, in which case, the device may remain in a current state or transition to a new state based on the determination in the response, and the decision engine may use the updated weights for generating sensor data signatures from sensor data captured by the sensors in the future.

In certain example embodiments, if the context engine is unable to arrive at a determination regarding whether a user is present in or absent from the detection region, the context engine may send a request for additional historical sensor data to one or more remote servers. The remote server(s) may access the additional historical sensor data, which may span an even longer period of time than historical sensor data to which the context engine has access. Further, the historical sensor data accessible by the remote server(s) may include sensor data captured by sensors of multiple electronic devices. In certain example embodiments, the remote server(s) may execute one or more machine learning algorithms on the historical sensor data to generate machine-learning response data which may also be provided to the context engine. The context engine may evaluate the filtered sensor data captured by the sensors of the electronic device against the longer epoch historical sensor data to make a determination regarding whether a user is present in or absent from the detection region. Further, in certain example embodiments, the context engine may refine the sensor data weights based on machine-learning response data received from the remote server(s).

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

Figure 3:
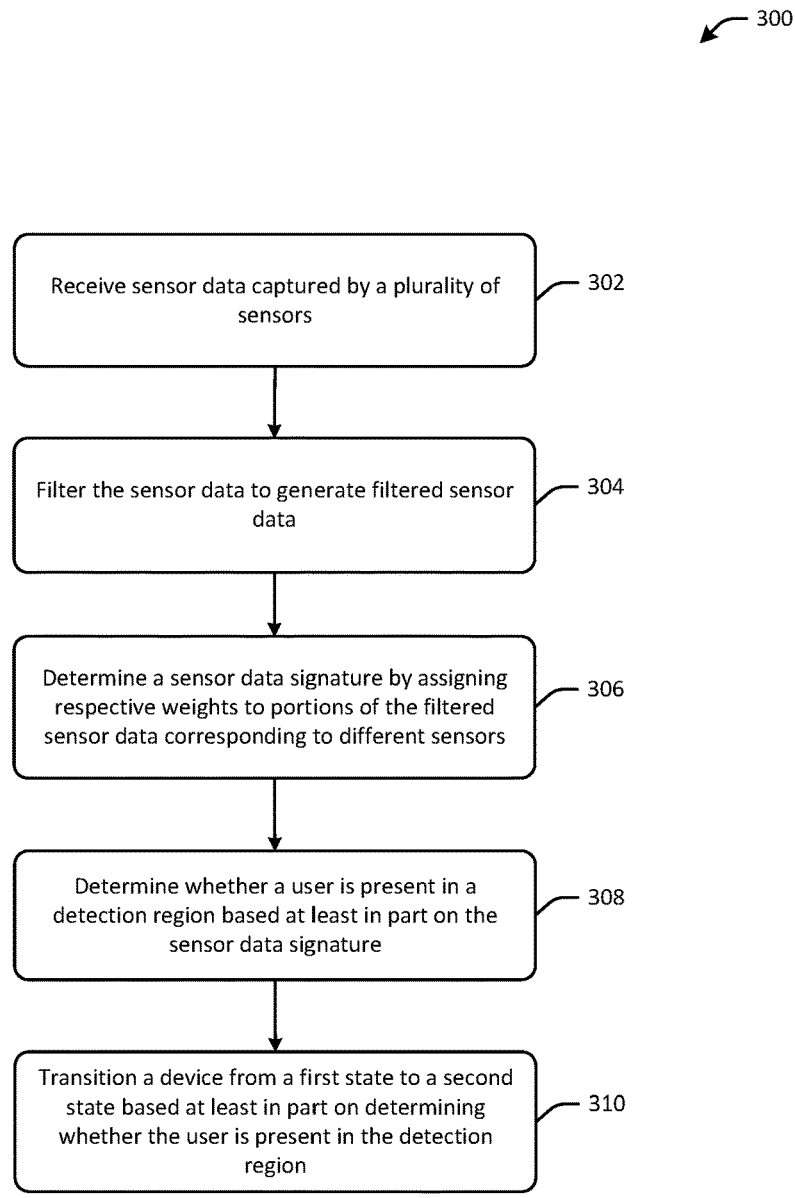
FIG. 3 is a process flow diagram of an illustrative method for determining whether a user is present in a detection region associated with an electronic device using sensor data captured by a variety of sensors of the electronic device and transitioning the electronic device from a first state to a second state based at least in part on determining whether the user is present in the detection region in accordance with one or more example embodiments of the disclosure.
Figure 4:
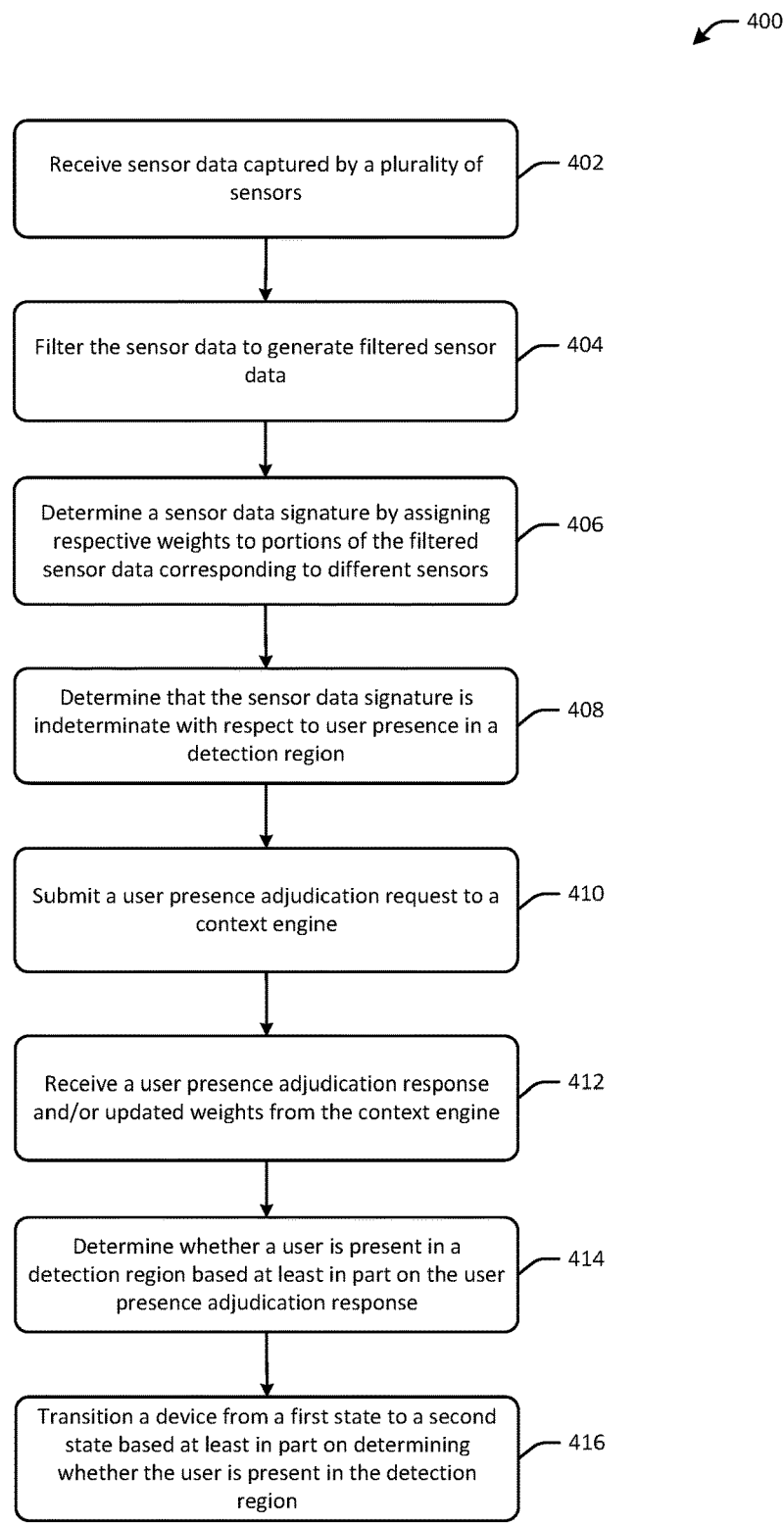
FIG. 4 is a process flow diagram of an illustrative method for submitting a user presence adjudication request to a context engine if a determination of user presence within a detection region cannot be made based on sensor data captured in real-time by sensors of an electronic device, receiving a user presence adjudication response from the context engine that indicates a user presence determination and/or updated sensor data weights for determining user presence, determining whether a user is present in the detection region based at least in part on the user presence adjudication response, and transitioning the electronic device from a first state to a second state based at least in part on the user presence determination in accordance with one or more example embodiments of the disclosure.

FIG. 1 is a schematic diagram illustrating user presence detection in an environment around an electronic device using sensor data captured by a variety of sensors and transitioning the device from a first state to a second state based on the detected user presence in accordance with one or more example embodiments of the disclosure. FIG. 3 is a process flow diagram of an illustrative method for determining whether a user is present in a detection region associated with an electronic device using sensor data captured by a variety of sensors of the electronic device and transitioning the electronic device from a first state to a second state based at least in part on determining whether the user is present in the detection region in accordance with one or more example embodiments of the disclosure. FIG. 4 is a process flow diagram of an illustrative method for submitting a user presence adjudication request to a context engine if a determination of user presence within a detection region cannot be made based on sensor data captured in real-time by sensors of an electronic device, receiving a user presence adjudication response from the context engine that indicates a user presence determination and/or updated sensor data weights for determining user presence, determining whether a user is present in the detection region based at least in part on the user presence adjudication response, and transitioning the electronic device from a first state to a second state based at least in part on the user presence determination in accordance with one or more example embodiments of the disclosure. FIGS. 3 and 4 will be described hereinafter in conjunction with FIG. 1.

FIG. 1 depicts an example electronic device 102. The electronic device 102 may include a display 104 such as a touch-panel display configured to detect touch-based user interactions with the display 104. The display 104 may be any of the example types of displays described earlier. In certain example embodiments, the electronic device may also enable voice-based interactions. The electronic device 102 may be designed for non-handheld interaction. For example, the device 102 may be placed on a surface such as a table surface in a residential room, a kitchen counter, or the like.

The device 102 may be configured to transition between states (e.g., power states) (or remain in a current state) when user presence is detected in a detection region 108. The detection region 108 may be a portion of an environment that includes the device 102 and that is within a detectable range of multiple sensors 112(1)-112(N) of the device 102. More specifically, the device 102 may be configured to determine when a user 106 is present in the detection region 108 and transition from a first device state 110A to a second device state 110B. The first device state 110A may be a low-power device state in which the electronic device 102 is powered off or an idle or dormant state in which the electronic device 102 is powered on but the display 104 is powered off. The second device state 110B may be a higher-power device state in which the electronic device 102 and the display 104 are powered on and content is being rendered on the display 104 such as, for example, a home screen containing customizable content. In other example embodiments, the first device state 110A may be an operational/user mode in which a minimal amount of content is rendered on the display 104 of the electronic device 102 (e.g., a current date and/or time) and the second device state 110B may be an operational/user mode in which an increased amount of content is rendered on the display 104. It should be appreciated that the device 102 may also transition states or maintain a current state if the user 106 is determined to be absent from the detection region 108.

The electronic device 102 may include a variety of types of sensors 112(1)-112(N). Any given sensor of the plurality of sensors 112(1)-112(N) may be referred to herein generically as sensor 112. Such sensors may include any of the example types of sensors described earlier. In certain example embodiments, the various sensors 112(1)-112(N) of the device 102 may sense conditions within the detection region 108 and generate respective sensor data 114(1)-114(N) indicative of the sensed conditions. Sensor data generated by any given sensor 112 may be referred to herein generically as sensor data 114. More specifically, each of the sensors 112(1)-112(N) of the device 102 may be configured to sense a particular type of input and generate respective sensor data 114(1)-114(N) indicative of one or more characteristics of the sensed input such as, for example, a frequency, amplitude, phase, or the like of a detected analog signal.

In certain example embodiments, a combination of sensor data 114(1)-114(N) captured by the multiple sensors 112(1)-112(N) of the electronic device 102 may be used to determine user presence in or absence from the detection region 108. Referring now to FIG. 3 in conjunction with FIG. 1, at block 302, one or more computer processors of the electronic device 102 (e.g., processor(s) 610 described in more detail in reference to FIG. 6) may receive sensor data 114(1)-114(N) captured by the plurality of sensors 112(1)-112(N). At block 304, the processor(s) may filter the sensor data 114(1)-114(N) from each sensor of the device 102 using a respective sensor data filters 116(1)-116(N) to generate filtered sensor data 118. Any given sensor data filter may be referred to herein generically as sensor data filter 116. The filters 116(1)-116(N) may include, without limitation, a low-pass filter, a band-pass filter, a high-pass filter, or the like. The sensor data 114(1)-114(N) may be filtered to, for example, remove noise from the sensor data 114(1)-114(N) and generate the filtered sensor data 118 having a greater likelihood of being representative of user presence in or absence from the detection region 108.

Still referring to FIG. 3 in conjunction with FIG. 1, at block 306, a decision engine 120 (which may include the structure and functionality of the decision engine previously described) may apply a respective weight to corresponding filtered sensor data 118 from each of one or more of the sensors 112(1)-112(N) to obtain respective weighted filtered sensor data. For example, the decision engine 120 may receive a weight (e.g., a multiplier) from a context engine 122 (which may correspond in structure and functionality to the context engine previously described). The weight may correspond to a particular sensor 112. The decision engine 120 may multiply one or more sensor data values of sensor data 114 generated by the particular sensor 112 by the weight to generate corresponding weighted sensor data values. After applying the respective weights to the corresponding filtered sensor data 118 from one or more sensors 112 to obtain respective weighted filtered sensor data, the decision engine 120 may generate a sensor data signature from the various weighted and/or non-weighted sensor data values. In certain example embodiments, the sensor data signature may be represented as a covariance matrix generated from the various weighted and/or non-weighted sensor data values.

As previously described, in certain example embodiments, the context engine 122 may determine the weights based on the presence or absence of user presence verification events 126 in connection with historical sensor data. A user presence verification engine 124 may be provided that is configured to identify the user presence verification events 126 and provide an indication thereof to the context engine 122. The user presence verification engine 124 may include any suitable combination of hardware, software, and/or firmware. More specifically, the user presence verification engine 124 may include a set of computer-executable instructions for determining the presence or absence of user presence verification events that provide a default indication of user presence. The user presence verification engine 124 may generate user presence verification event data that indicates that a user presence verification event was detected and a timestamp associated with the event. In certain example embodiments, the user presence verification event data may further indicate a type of user presence verification event that was detected. In certain example embodiments, the user presence verification engine 124 may be configured to distinguish sensor data that is indicative of a user presence verification event from sensor data that is not. For example, the user presence verification engine 124 may determine whether audio data captured by a microphone of the device 102 includes a wake word or phrase, and if so determined, may determine that a user presence verification event has occurred.

A user presence verification event may be any event that provides a suitably deterministic indication of user presence. For example, a user presence verification event may include any user interface switch, button, or touch event or any audible sound, vibration, or visual image above a ground truth threshold. The ground truth threshold may be selected to distinguish events that are ambiguous with respect to user presence from events that are designated as definitively indicating user presence. Example user presence verification events include, without limitation, device power state sequences of an electronic device; user control settings of the device; a touch event detected at a touch-sensitive display of the device; audio streaming on the device; a user's face detected by a camera of the device; audio data captured by a microphone of the device that is indicative of a trigger word or phrase; a power-off timer setting of the device; a stay-on power setting of the device; a time of day; keep-alive presence sensing; and so forth. It should it appreciated that the above examples of user presence verification events are merely illustrative and not exhaustive. A user presence verification event may be any event that provides a suitably deterministic indication of user presence in the detection region 108 and may include any of the example types of events previously described. Further, the context engine 122 may update the weights over time as additional historical sensor data and user presence verification event data 126 is generated.

At block 308, the decision engine 120 may determine whether the user 106 is present in the detection region 108 based at least in part on the real-time sensor data signature determined at block 306. More specifically, the decision engine 120 may compare the real-time sensor data signature to various stored sensor data signatures to determine if the sensor data signature matches a stored sensor data signature. A stored sensor data signature may have a predefined association with a user presence or user absence determination. In certain example embodiments, a stored sensor data signature may be representative of historical sensor data captured by the sensors 112(1)-112(N) of the device 102. One or more user presence verification events 126 may have been determined to be present or absent during a time range that at least partially overlaps with a time range during which the historical sensor data was captured. Based on the presence or absence of such user presence verification event(s) 126, the stored sensor data signature representative of the historical sensor data may be determined to be associated with user presence or user absence. As such, if a match is detected between the sensor data signature generated from the real-time captured sensor data 114(1)-114(N) (or more specifically from the weighted and/or non-weighted filtered sensor data) and a stored sensor signature, the decision engine 120 may determine that the real-time sensor data signature corresponds to the user presence or user absence determination associated with the stored sensor data signature.

Upon determining, at block 308, that the real-time sensor data signature matches a stored sensor data signature associated with a user presence determination, the decision engine 120 may determine that the real-time sensor data signature is indicative of presence of the user 106 in the detection region 108. In response to a determination 128 that the user 106 is present in the detection region 108, the electronic device 102 may transition from a first device state 110A (e.g., a low-power device state) to a second device state 110B (e.g., a higher-power device state) at block 310. For example, the device 102 may transition from the first device state 110A in which the display 104 is powered off to the second device state 110B in which the display 104 is powered on. In certain example embodiments, if the electronic device 102 is already in the higher-power device state 110B, that device state may be maintained in response to the user presence determination 128. Although not depicted in FIG. 1, in certain example embodiments, the device may be configured to transition from the higher-power device state 110B to the lower-power device state 110A in response to a user absence determination (e.g., a determination that a real-time sensor data signature generated from the combined sensor output of the multiple sensors 112(1)-112(N) indicates that the user 106 is not present in the detection region 108). For example, the device 102 may be configured to transition from the device state 110B in which the display 104 is powered on to a device state (which may be the device state 110A) in which the display 104 is powered off but the device 102 is still powered on in response to a combined sensor output indicative of absence of the user 106 from the detection region 108 over a threshold period of time (e.g., a timeout period). The device 102 may further transition to even lower-power device states (e.g., a sleep state, a state in which the device 102 is completely powered off, etc.) after additional timeout period(s) elapse. Such additional timeout period(s) may be user-configurable.

As previously described, in certain example embodiments, the decision engine 120 may not be able to make a determination as to presence or absence of the user 106 in/from the detection region 108 based on the sensor output from a particular combination of the sensors 112(1)-(N). In such example embodiments, the device 102 may activate one or more sensors 112 not included among the particular combination of sensors and utilize sensor data 114 captured by the one or more activated sensors in combination with the sensor output from the particular combination of sensors to make a determination regarding presence or absence of the user 106 in/from the detection region 108. In an example scenario, the decision engine 120 may not be able to make a determination regarding whether the user 106 is present in or absent from the detection region 108 due to conflicting sensor data 114. In such an example scenario, the device may activate one or more additional sensors 112 to capture additional sensor data 114 (or otherwise utilize additional sensor data 114 from one or more already active sensors) to resolve the conflict.

Referring now to FIG. 4 in conjunction with FIG. 3, the operations at blocks 402-406 may correspond to the operations at blocks 302-306, respectively. At block 408, the decision engine 120 may send a user presence adjudication request 130 to the context engine 122. The decision engine 120 may send the user presence adjudication request 130 to the context engine 122 if, for example, the decision engine 120 is unable to make a determination regarding whether the user 106 is present in or absent from the detection region 108 based on the real-time sensor data signature generated from the sensor data 114. Example embodiments in which the decision engine 120 sends the user presence adjudication request 130 to the context engine 122 may include those in which the sensor data 114 includes conflicting data; those in which each of the sensors 112(1)-112(N) of the electronic device 102 (or some threshold number of the sensors 112(1)-112(N)) captures sensor data 114 indicating high levels of sensed inputs in the detection region 108 (e.g., a level above a threshold value); those in which each of the sensors 112(1)-112(N) of the electronic device 102 (or some threshold number of sensors 112) captures sensor data 114 indicating very low levels of sensed inputs in the detection region 108; or those in which the real-time sensor data signature does not match a historical stored sensor data signature.

After sending the user presence adjudication request to the context engine 122, the decision engine 120 may receive a user presence adjudication response 132 from the context engine 122 at block 412. In particular, the context engine 122 may receive the real-time sensor data 114 captured by the sensors 112(1)-112(N) of the electronic device 102 and may make a default determination regarding whether to transition a device state of the device 102. This default determination may be indicated in the user presence adjudication response 132. For example, in the scenario in which the sensor data indicates very high levels of sensed inputs, the context engine 122 may make a determination that the device 102 should transition from the device state 110B to the device state 110A (or remain in the device state 110A if already in that state). This determination may be predetermined based on the assumption that sensor data that indicates very high levels of sensed inputs is likely to reflect a scenario in which the detection region is associated with a high-occupancy state where a large number of users are present in the detection region 108, thereby making interaction between a specific user (e.g., the user 106) and the device 102 less likely. On the other hand, in those example embodiments in which the sensor data 114(1)-114(N) indicates low levels of sensed inputs that are nonetheless higher than expected levels, the context engine 122 may make a default determination that the device 102 is to transition from the device state 110A to the device state 110B to bias towards false positive detection. It should be appreciated that these default determinations may be reversed.

In other example embodiments, the context engine 122 may have access to stored historical sensor data (e.g., stored sensor data signatures) that spans a longer period of time than what the decision engine 120 has access to. In such example embodiments, the context engine 122 may be able to determine a matching stored sensor data signature for the real-time sensor data 114 when the decision engine 120 cannot. The matching stored sensor data signature identified by the context engine 122 may have a predefined association with a user presence or user absence determination. As previously described, one or more user presence verification events 126 may be used to identify the user presence or user absence determination to associate with a stored sensor data signature.

In certain example embodiments, the user presence adjudication response 132 may include one or more updated weights in addition to or in lieu of an indication of presence of the user 106 in or absence of the user 106 from the detection region 108. The context engine 122 may determine the updated weights as additional historical sensor data and additional user presence verification data 126 is collected. In certain example embodiments, the user presence adjudication response 132 may include the updated weights in lieu of a user absence or user absence determination, in which case, the decision engine 120 may apply the updated weights to the real-time filtered sensor data 114 to arrive at an appropriate determination regarding user presence or user absence from the detection region 108 at block 414. In other example embodiments, the user presence adjudication response 132 may include the updated weights in addition to the user presence or user absence determination, in which case, the device 102 may remain in a current state or transition to a new state at block 416 based on the determination in the response 132, and the decision engine 120 may use the updated weights for generating sensor data signatures from sensor data captured by the sensors 112 in the future.

Figure 2:
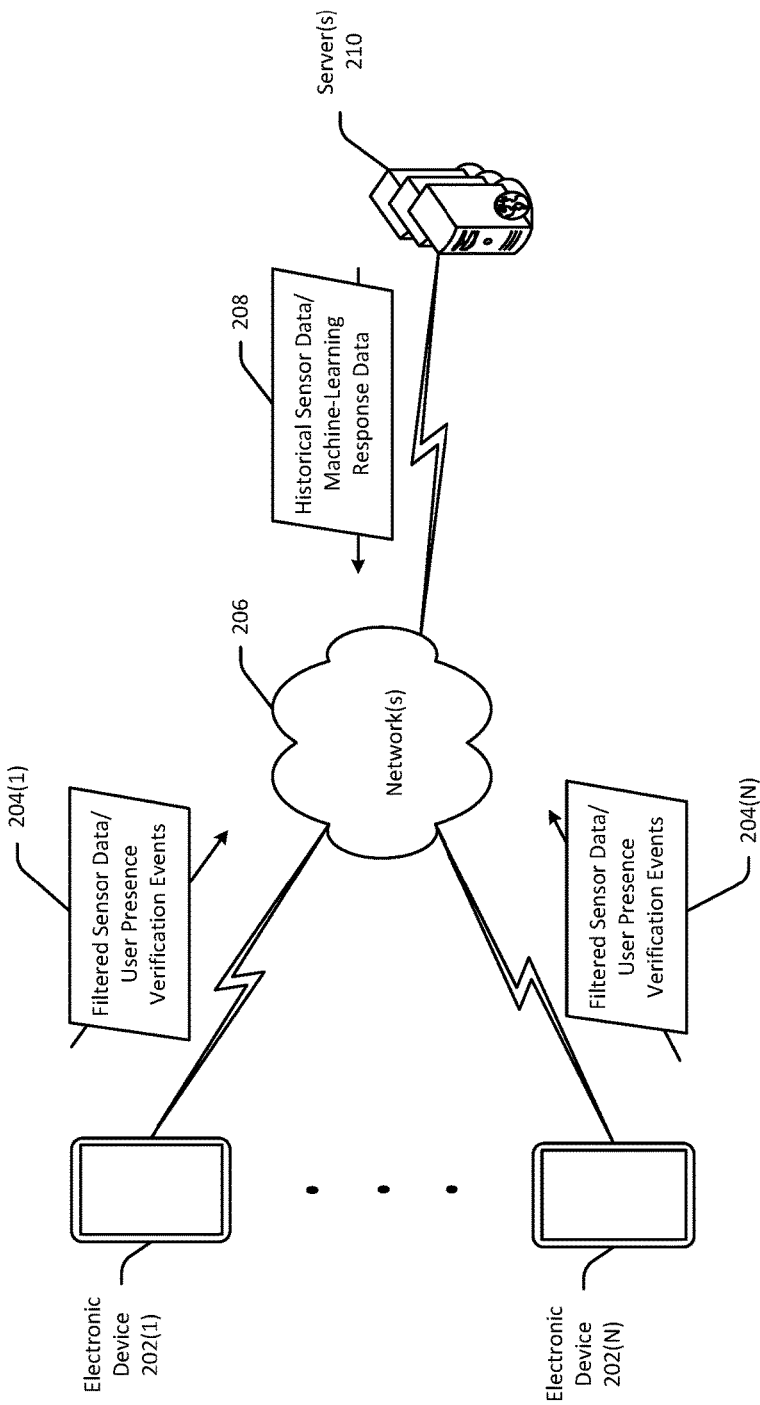
FIG. 2 is a schematic diagram illustrating example data exchanges between user devices and remote server(s) in accordance with one or more example embodiments of the disclosure.

FIG. 2 is a schematic diagram illustrating example data exchanges between electronic devices 202(1)-202(N) and remote server(s) 210 in accordance with one or more example embodiments of the disclosure. The electronic devices 202(1)-202(N) may be configured to communicate with the remote server(s) 210 via one or more networks 206 which may include any of the example types of networks and transmission media described later in this disclosure in reference to the network(s) 608 depicted in FIG. 6. The electronic devices 202(1)-202(N) may include the electronic device 102. In certain example embodiments, if the context engine 122 is unable to arrive at a determination regarding whether the user 106 is present in or absent from the detection region 108, the context engine 122 may send a request for additional historical sensor data 208 to the remote server(s) 210. The remote server(s) 210 may access the additional historical sensor data 208, which may span an even longer period of time than historical sensor data that the context engine 122 has access to. Further, the historical sensor data 208 accessible by the remote server(s) 210 may include sensor data 204(1)-204(N) captured by sensors of the multiple electronic devices 204(1)-204(N). The historical sensor data 208 may further include user presence verification events associated with the multiple electronic devices 204(1)-204(N). In certain example embodiments, the remote server(s) 210 may execute one or more machine learning algorithms on the historical sensor data 208 to generate machine-learning response data 208 which may also be provided to the context engine 122. The context engine 122 may evaluate the filtered sensor data 118 against the historical sensor data 208 to make a determination regarding whether the user 106 is present in or absent from the detection region 108. Further, in certain example embodiments, the context engine 122 may refine the sensor data weights based on machine-learning response data 208.

Figure 5:
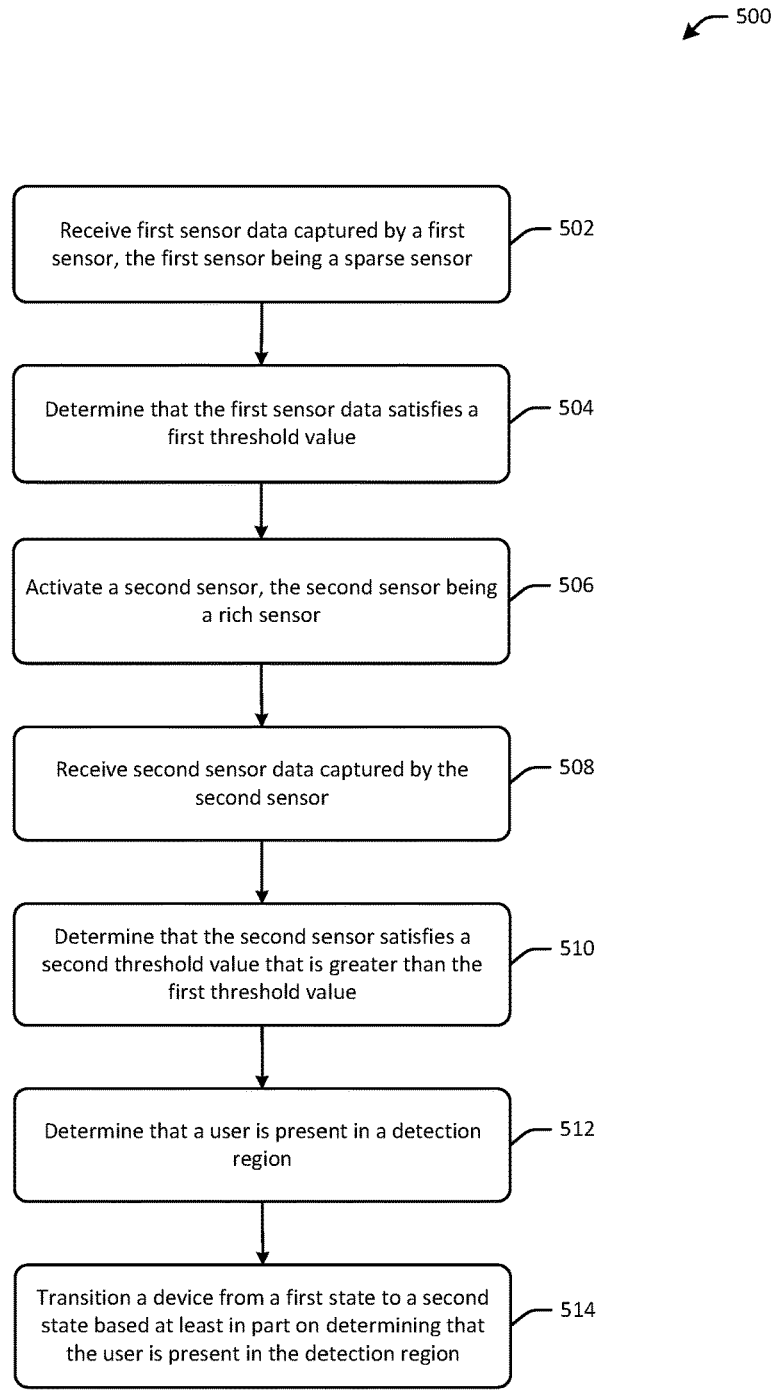
FIG. 5 is a process flow diagram of an illustrative method for sequentially activating sensors of an electronic device in accordance with one or more example embodiments of the disclosure.

FIG. 5 is a process flow diagram of an illustrative method 500 for sequentially activating sensors of an electronic device in accordance with one or more example embodiments of the disclosure. FIG. 5 will be described in conjunction with FIG. 1.

At block 502, the decision engine 120 may receive first sensor data captured by a first sensor. The first sensor may be a sparse sensor. For example, the first sensor may be an accelerometer that requires relatively low power for activation and has relatively low latency associated with activation as compared to a rich sensor such as a microphone array or a camera. In certain example embodiments, the first sensor may have a broad range of coverage. For example, the first sensor may be a 360 degree accelerometer configured to sense vibration in all directions in at least a two-dimensional plane of the detection region 108.

At block 504, the decision engine 120 may determine that the first sensor data satisfies a first threshold value. The first threshold value may be a relatively low confidence value such that accelerometer data indicative of even low-level vibrations in the detection region 108 may satisfy the first threshold value.

At block 506, the decision engine 120 may activate a second sensor. The second sensor being a rich sensor such as a microphone array or a camera. The second sensor may require more power than the first sensor to become activated and/or may have a higher latency associated with activation than the first sensor. Further, in certain example embodiments, the second sensor may have a narrower range of coverage than the first sensor. For example, the second sensor may be a camera with a field-of-view that is less than 360 degrees.

Because the first sensor has lower power requirements and/or a lower latency of activation than the second sensor, the first sensor can be used to capture initial sensor data with low overhead. Further, because a low confidence threshold is associated with the sensor data captured by the first sensor, the decision engine 120 may activate the second sensor when the user is still out-of-range of the second sensor, thereby allowing the second sensor enough time to power-on by the time the user enters the range of the second sensor. For example, accelerometer data generated as a result of vibrations caused by human footsteps when the human is outside the field-of-view of a camera may trigger activation of the camera such that the camera is ready to sense by the time the human enters the field-of-view of the camera.

At block 508, the decision engine 120 may receive second sensor data captured by the second sensor. At block 510, the decision engine 120 may determine that the second sensor satisfies a second threshold value that is greater than the first threshold value. The second threshold value may be greater than the first threshold value because the second sensor is a richer sensor than the first sensor, and thus, capable of generating sensor data that is more probative of user presence in or user absence from the detection region 108.

Upon determining that the sensor data received from the second sensor satisfies the second threshold value, the decision engine 120 may determine that a user is present in the detection region 108 at block 512. Then, at block 514, the decision engine 120 may cause the device 102 to transition from a first state to a second state based at least in part on determining that the user is present in the detection region 108.

It should be appreciated that the method 500 may be extrapolated to any number of additional sensors. For example, the determination that the sensor data received from the second sensor satisfies the second threshold value may trigger activation of a third sensor, a determination that sensor data received from the third sensor satisfies a third threshold value may trigger activation of a fourth sensor, and so forth. In this manner, any number of sensors may be sequentially activated. The final sensor to be activated may ultimately mediate the device state transition.

Figure 6:
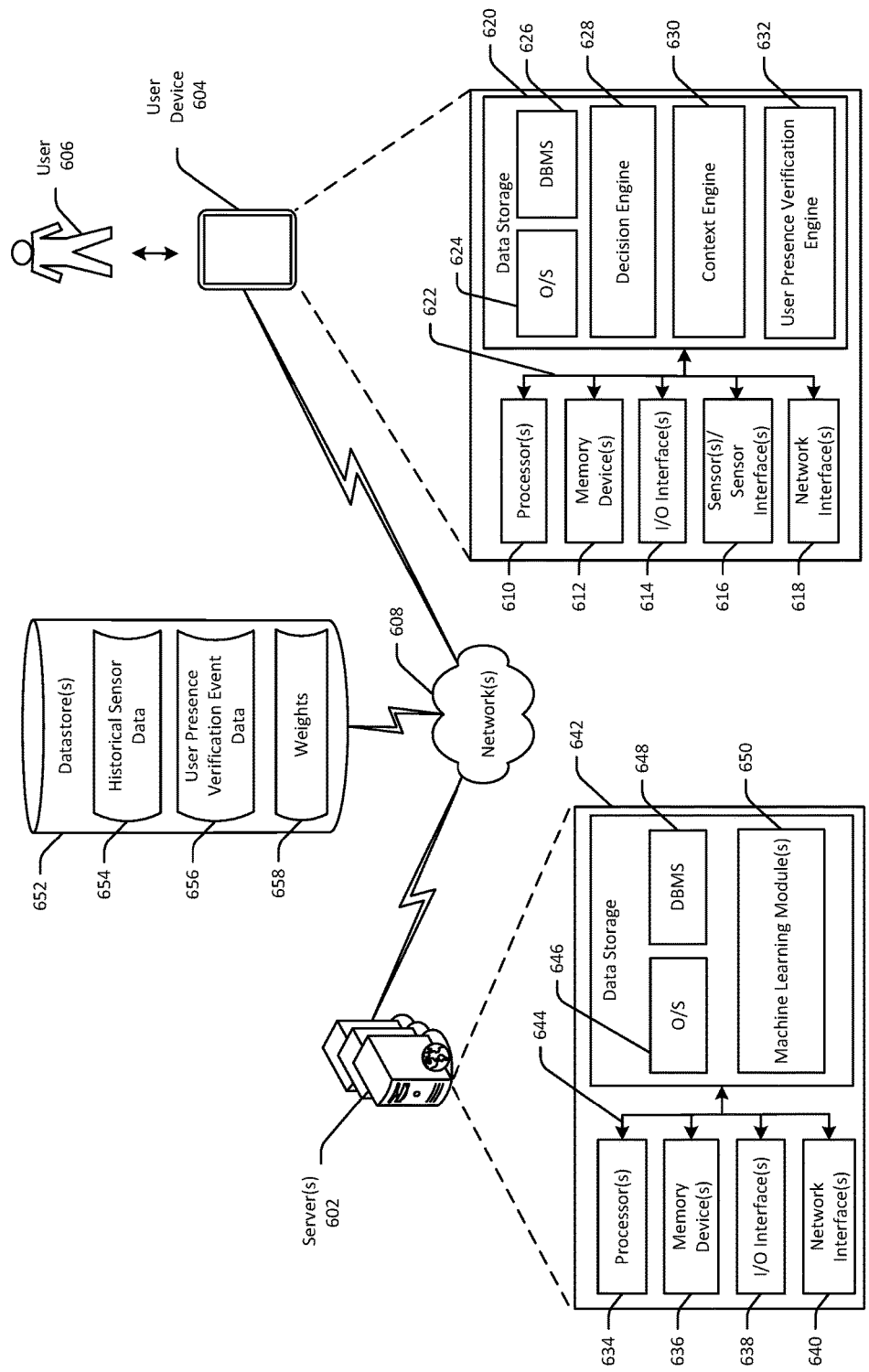
FIG. 6 is a schematic diagram of an illustrative networked architecture in accordance with one or more example embodiments of the disclosure.

FIG. 6 is a schematic diagram of an illustrative networked architecture 600 in accordance with one or more example embodiments of the disclosure. The networked architecture 600 may include one or more servers 602 and one or more user devices 604. One or more users 606 may interact with the user device(s) 604. For example, a user 606 may utilize a user device 604 to access one or more applications executing on the user device 604 and view or otherwise interact with content displayed on a display of the user device 604. The user device(s) 604 may, in various example embodiments, include the electronic device 102 depicted in FIG. 1. While the server(s) 602 and/or the user device(s) 604 may be referred to herein in the singular, it should be appreciated that multiple ones of any of the illustrative components of the networked architecture 600 may be provided, and any processing described as being performed by a particular component of the architecture 600 may be performed in a distributed manner by multiple such components.

The server 602 and the user device 604 may be configured to communicate via one or more networks 608. In addition, a first user device 604 may be configured to communicate with a second user device 604 via the network(s) 608 (and potentially via the server 602). The network(s) 608 may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, the network(s) 608 may have any suitable communication range associated therewith and may include, for example, global networks (e.g., the Internet), metropolitan area networks (MANs), wide area networks (WANs), local area networks (LANs), or personal area networks (PANs). In addition, the network(s) 608 may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the user device 604 may include one or more processors (processor(s)) 610, one or more memory devices 612 (generically referred to herein as memory 612), one or more input/output ("I/O") interface(s) 614, one or more sensors or sensor interfaces 616, one or more network interfaces 618, and data storage 620. The user device 604 may further include one or more buses 622 that functionally couple various components of the user device 604. The data storage 620 may store one or more operating systems (O/S) 624; one or more database management systems (DBMS) 626; and one or more engines, program modules, applications, or the like including, without limitation, a decision engine 628, a context engine 630, and a user presence verification engine 632. Each of the example engines depicted as part of the user device 604 may include computer-executable instructions, code, or the like that may be loaded into the memory 612 and executable by one or more of the processor(s) 610 to cause various operations to be performed. Execution of the engines of the user device 604 may cause operations to be performed similar to those described in relation to correspondingly named engines depicted in FIG. 1.

The bus(es) 622 may include at least one of a system bus, a memory bus, an address bus, or a message bus, and may permit exchange of information (e.g., data (including computer-executable code), signaling, etc.) between various components of the server 602. The bus(es) 622 may include, without limitation, a memory bus or a memory controller, a peripheral bus, an accelerated graphics port, and so forth. The bus(es) 622 may be associated with any suitable bus architecture including, without limitation, an Industry Standard Architecture (ISA), a Micro Type Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 612 of the user device 604 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 612 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 612 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 620 may include removable storage and/or non-removable storage including, but not limited to, magnetic storage, optical disk storage, and/or tape storage. The data storage 620 may provide non-volatile storage of computer-executable instructions and other data. The memory 612 and the data storage 620, removable and/or non-removable, are examples of computer-readable storage media (CRSM) as that term is used herein.

The data storage 620 may store computer-executable code, instructions, or the like (e.g., such as computer-executable code of the engines 628-632) that may be loadable into the memory 612 and executable by the processor(s) 610 to cause the processor(s) 610 to perform or initiate various operations. The data storage 620 may additionally store data that may be copied to memory 612 for use by the processor(s) 610 during the execution of the computer-executable instructions. Moreover, output data generated as a result of execution of the computer-executable instructions by the processor(s) 610 may be stored initially in memory 612, and may ultimately be copied to data storage 620 for non-volatile storage.

The datastore(s) 652 may include, without limitation, databases (e.g., relational, object-oriented, etc.), file systems, flat files, distributed datastores in which data is stored on more than one node of a computer network, peer-to-peer network datastores, or the like. The datastore(s) 652 may store various types of data such as, for example, historical sensor data 654, user presence verification event data 656, and weights 658 to be applied to sensor data captured by the sensors 616. Any data stored in the datastore(s) 652 may be generated by the server 602 and/or the user device 604. Any data stored in one or more datastores 652 may be accessed via the DBMS 626, stored in the data storage 620, and loaded in the memory 612 for use by the processor(s) 610 in executing computer-executable code of any of the engines. Further, any data stored in the datastore(s) 652 may be generated by one component of the networked architecture 600, stored in the datastore(s) 652, and retrieved from the datastore(s) 652 by another component of the networked architecture 600. In certain example embodiments, the datastore(s) 652 may include one or more datastores that are only accessible by the server 602. For example, the historical sensor data 654 may include longer epoch historical sensor data that is only accessible by the server 602.

The processor(s) 610 may be configured to access the memory 612 and execute computer-executable instructions loaded therein. For example, the processor(s) 610 may be configured to execute computer-executable instructions of the various program modules of the server 602 to cause or facilitate various operations to be performed in accordance with one or more embodiments of the disclosure. The processor(s) 610 may include any suitable processing unit capable of accepting data as input, processing the input data in accordance with stored computer-executable instructions, and generating output data. The processor(s) 610 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 610 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 610 may be capable of supporting any of a variety of instruction sets.

Referring now to other illustrative components depicted as being stored in the data storage 620, the O/S 624 may be loaded from the data storage 620 into the memory 612 and may provide an interface between other application software executing on the user device 604 and hardware resources of the user device 604. More specifically, the O/S 624 may include a set of computer-executable instructions for managing hardware resources of the user device 604 and for providing common services to other application programs (e.g., managing memory allocation among various application programs). The O/S 624 may include any operating system now known or which may be developed in the future including, but not limited to, any server operating system, any mainframe operating system, or any other proprietary or non-proprietary operating system.

The DBMS 626 may be loaded into the memory 612 and may support functionality for accessing, retrieving, storing, and/or manipulating data stored in the memory 612 and/or data stored in the data storage 620. The DBMS 626 may use any of a variety of database models (e.g., relational model, object model, etc.) and may support any of a variety of query languages. The DBMS 626 may access data represented in one or more data schemas and stored in any suitable data repository.

Referring now to other illustrative components of the server 602, one or more input/output (I/O) interfaces 614 may be provided that may facilitate the receipt of input information by the user device 604 from one or more I/O devices as well as the output of information from the user device 604 to the one or more I/O devices. The I/O devices may include, for example, one or more user interface devices that facilitate interaction between a user and the user device 604 including, but not limited to, a display (which may be touch-sensitive display), a keypad, a pointing device, a control panel, a remote control device, a microphone, a speaker, and so forth. The I/O devices may further include, for example, any number of peripheral devices such as data storage devices, printing devices, and so forth.

The sensor(s)/sensor interface(s) 616 may include any suitable type of sensing device such as, for example, an image sensor (e.g., a camera), a touch sensor, an acoustic sensor, an electromagnetic radiation sensor (e.g., a RADAR sensor, a LIDAR sensor, etc.), an inertial sensor, a force sensor, a thermal sensor, an ambient light sensor, and so forth. Example types of inertial sensors may include accelerometers (e.g., MEMS-based accelerometers), gyroscopes, and so forth.

In addition, although not depicted in FIG. 6, the user device 604 may further include one or more antennas such as, for example, a cellular antenna for transmitting or receiving signals to/from a cellular network infrastructure, a Wi-Fi antenna for transmitting or receiving Wi-Fi signals to/from a wireless access point, an antenna for receiving GNSS signals from a GNSS satellite, a Bluetooth antenna for transmitting or receiving Bluetooth signals, and one or more other antennas such as, for example, a Near Field Communication (NFC) antenna for transmitting or receiving NFC signals. In certain example embodiments, such antenna(s) may include a shared antenna capable of transmitting and receiving data using multiple different wireless communication standards.

Such antenna(s) may include any suitable type of antenna depending, for example, on the communications protocols used to transmit or receive signals via the antenna(s). Non-limiting examples of suitable antennas may include directional antennas, non-directional antennas, dipole antennas, folded dipole antennas, patch antennas, multiple-input multiple-output (MIMO) antennas, or the like.

Such antenna(s) may be communicatively coupled to one or more radios to which or from which signals may be transmitted or received. The radio(s) may include any suitable component(s) for, in cooperation with the antenna(s), transmitting or receiving RF signals in the bandwidth and/or channels corresponding to the communications protocols utilized by the user device 604 to communicate with other devices. The radio(s) may include hardware, software, and/or firmware for modulating, transmitting, or receiving—potentially in cooperation with any of antenna(s)—communications signals according to any of the communications protocols discussed above including, but not limited to, one or more Wi-Fi and/or Wi-Fi direct protocols, as standardized by the Institute of Electrical and Electronics Engineers (IEEE) 802.11 standards, one or more Bluetooth protocols, or one or more cellular communications protocols or standards. Such radio(s) may further include hardware, firmware, or software for receiving GNSS signals from a corresponding antenna. Such radio(s) may include any known receiver and baseband suitable for communicating via the communications protocols utilized by the user device 704. Such radio(s) may further include a low noise amplifier (LNA), additional signal amplifiers, an analog-to-digital (A/D) converter, one or more buffers, digital baseband, or the like.

The user device 604 may further include one or more network interfaces 618 via which the user device 604 may communicate with any of a variety of other systems, platforms, networks, devices, and so forth. Such communication may occur via any of one or more of the network(s) 608.

In an illustrative configuration, the server 602 may include one or more processors (processor(s)) 634, one or more memory devices 636 (generically referred to herein as memory 636), one or more input/output ("I/O") interface(s) 638, one or more network interfaces 640, and data storage 642. The server 602 may further include one or more buses 644 that functionally couple various components of the server 602. The data storage 642 may include one or more operating systems 646, one or more DBMS 648, and one or more program modules, engines, applications, or the like including, without limitation, one or more machine learning modules 650. The machine learning module(s) may include computer-executable code, instructions, or the like that may be loaded into the memory 636 for execution by one or more of the processor(s) 634 to cause machine-learning data to be generated from historical data. Any of the functionality associated with program module(s) depicted as part of the server 602 and/or any functionality associated with any engines depicted as part of the user device 604 may be distributed, at least partially, between the server 602 and the user device 604. Further, any of the illustrative hardware/software components of the server 602 may correspond in type and/or function to correspondingly named components of the user device 604.

It should be appreciated that the program modules, applications, computer-executable instructions, code, or the like depicted in FIG. 6 as being stored in the data storage 620 and the data storage 642 are merely illustrative and not exhaustive and that processing described as being supported by any particular module may alternatively be distributed across multiple modules or performed by a different module. In addition, various program module(s), script(s), plug-in(s), Application Programming Interface(s) (API(s)), or any other suitable computer-executable code hosted locally on the server 602, locally on the user device 604, and/or hosted on other computing device(s) accessible via one or more of the network(s) 608, may be provided to support functionality provided by the program modules, applications, or computer-executable code depicted in FIG. 6 and/or additional or alternate functionality. Further, functionality may be modularized differently such that processing described as being supported collectively by the collection of program modules depicted in FIG. 6 may be performed by a fewer or greater number of modules, or functionality described as being supported by any particular module may be supported, at least in part, by another module. In addition, program modules that support the functionality described herein may form part of one or more applications executable across any number of systems or devices in accordance with any suitable computing model such as, for example, a client-server model, a peer-to-peer model, and so forth. In addition, any of the functionality described as being supported by any of the program modules depicted in FIG. 6 may be implemented, at least partially, in hardware and/or firmware across any number of devices.

It should further be appreciated that any of the components of the networked architecture 600 may include alternate and/or additional hardware, software, or firmware components beyond those described or depicted without departing from the scope of the disclosure. More particularly, it should be appreciated that software, firmware, or hardware components depicted as forming part of the server 602 and/or the user device 604 are merely illustrative and that some components may not be present or additional components may be provided in various embodiments. While various illustrative program modules have been depicted and described as software modules stored in data storage 620 or the data storage 646, it should be appreciated that functionality described as being supported by the program modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional modules not depicted may be present and may support at least a tile of the described functionality and/or additional functionality. Moreover, while certain modules may be depicted and described as sub-modules of another module, in certain embodiments, such modules may be provided as independent modules or as sub-modules of other modules.

While one or more operations of the methods 300-500 have been described above as being performed by one or more program modules, engines, applications, or the like executing on the user device 102 having the illustrative configuration of the user device 604, it should be appreciated that any such operation may be performed, at least in part, by one or more program modules, engines, applications, or the like executing on the server 602. In addition, it should be appreciated that processing performed in response to execution of computer-executable instructions provided as part of an application, program module, engine, or the like may be interchangeably described herein as being performed by the application, program module, or engine itself or by a device on which the application, program module, engine, or the like is executing. While the operations of the methods 300-500 may be performed in the context of the illustrative configuration of the user device 604 depicted in FIG. 6, it should be appreciated that such operations may be implemented in connection with numerous other device configurations.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program modules, applications, or the like disclosed herein may include one or more software components including, for example, software objects, methods, data structures, or the like. Each such software component may include computer-executable instructions that, responsive to execution, cause at least a tile of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program modules, or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A method, comprising:
   determining, by one or more computer processors of an electronic device, first sensor data captured by a first sensor of the electronic device during a first period of time;
   determining, by the one or more computer processors, that the first sensor data indicates an occurrence of an event;
   activating, by the one or more computer processors, a second sensor of the electronic device, wherein activating the second sensor includes providing power to the second sensor during a second period of time;
   determining, by the one or more computer processors, second sensor data captured by the second sensor of the electronic device during the second period of time, wherein the second period of time starts subsequent to a beginning of the first period of time;
   determining, by the one or more computer processors, a first sensor data signature comprising at least a portion of the first sensor data and at least a portion of the second sensor data;
   determining, by the one or more computer processors, that the first sensor data signature is within a threshold tolerance of a second sensor data signature, wherein the second sensor data signature comprises data captured by at least one of the first sensor or the second sensor prior to the first period of time; and
   causing, by the one or more computer processors, the electronic device to transition from a first state to a second state based at least in part on the determining that the first sensor data signature is within the threshold tolerance of the second sensor data signature.

2. The method of claim 1, wherein in the first state the device receives data having a first resolution, and wherein in the second state the device receives data having a second resolution that is higher than the first resolution.

3. The method of claim 1, wherein in the first state a display is powered off, and wherein in the second state a display is powered on.

4. The method of claim 1, wherein the event comprises a detection of a user in proximity to the electronic device.

5. The method of claim 1, wherein the second sensor consumes a greater amount of power than the first sensor.

6. The method of claim 1, wherein determining the first sensor data signature further comprises:
   removing, by the one or more computer processors, first noise from the first sensor data to generate first modified sensor data;
   removing, by the one or more computer processors, second noise from the second sensor data to generate second modified sensor data;
   determining, by the one or more computer processors, a presence of a user during the second period of time;
   determining, by the one or more computer processors, a first set of sensor data values from the first modified sensor data and a second set of sensor data values from the second modified sensor data;
   applying, by the one or more computer processors, a weight to the second set of sensor data values to generate a set of weighted sensor data values; and
   generating, by the one or more computer processors, the first sensor data signature using the first set of sensor data values and the set of weighted sensor data values.

7. The method of claim 6, further comprising:
   determining, by the one or more computer processors, that a location of the electronic device has changed from a first location to a second location; and
   modifying the weight based at least in part on one or more characteristics associated with the second location, wherein the one or more characteristics comprise at least one of a vibration characteristic of a physical material that is present at the location, an acoustic characteristic, or a wireless signal characteristic.

8. A method, comprising:
   receiving, by a one or more computer processors of an electronic device, first sensor data captured by a first sensor of the electronic device during a first period of time;
   determining, by the one or more computer processors, that the first sensor data indicates an occurrence of an event;
   activating, by the one or more computer processors, a second sensor of the electronic device, wherein activating the second sensor includes providing power to the second sensor during a second period of time;
   determining, by the one or more computer processors, second sensor data captured by the second sensor of the electronic device during the second period of time, wherein the second period of time starts subsequent to a beginning of the first period of time;
   determining, by the one or more computer processors, a first sensor data signature comprising at least a portion of the first sensor data and at least a portion of the second sensor data;
   determining, by the one or more computer processors, a second sensor data signature indicative of user presence in a detection region of the electronic device, wherein the second sensor data signature is based at least in part on data captured by at least one of the first sensor or the second sensor prior to the first period of time;

determining, by the one or more computer processors, that the first sensor data signature is within a threshold tolerance of the second sensor data signature; and causing, by the one or more computer processors, the electronic device to transition from a first state to a second state based at least in part on the determining that the first sensor data signature is within the threshold tolerance of the second sensor data signature.

9. The method of claim 8, further comprising:

determining a first matrix based at least in part on the first sensor data signature; and determining a second matrix based at least in part on the second sensor data signature;

wherein the determining that the first sensor data signature is within the threshold tolerance of the second sensor data signature is based at least in part on determining that the first matrix of the first sensor data signature is within the threshold tolerance of the second matrix of the second sensor data signature.

10. The method of claim 8, further comprising:

determining, by the one or more computer processors, third sensor data captured by the first sensor during a third period of time subsequent to the first period of time;

determining, by the one or more computer processors, fourth sensor data captured by the second sensor during the third period of time;

determining, by the one or more computer processors, fifth sensor data generated by at least one of the first sensor or the second sensor over a fourth period of time prior to the third period of time;

determining, by the one or more computer processors, that no user presence verification event occurred during the fourth period of time;

determining, by the one or more computer processors, a third sensor data signature comprising at least a portion of the third sensor data and at least a portion of the fourth sensor data;

determining, by the one or more computer processors, that the third sensor data signature is within the threshold tolerance of a fourth sensor data signature that comprises at least a portion of the fifth sensor data;

determining, by the one or more computer processors, that the fourth sensor data signature is stored in association with an indication of user absence from the detection region during the fourth period of time;

determining, by the one or more computer processors, user absence from a detection region of the electronic device during the third period of time; and causing, by the one or more computer processors, the electronic device to transition from the second state to the first state.

11. The method of claim 8, wherein the data captured by at least one of the first sensor or the second sensor prior to the first period of time comprises a baseline level of ambient noise.

12. The method of claim 8, wherein the second sensor data signature indicates a presence of a user, and wherein the second sensor data comprises one of touch input data or audio data comprising representation of a predetermined word or phrase.

13. The method of claim 8, further comprising:

determining, by the one or more computer processors, that the first sensor data satisfies a first threshold confidence value; and activating, by the one or more computer processors, the second sensor based at least in part on the first sensor data satisfying the first threshold confidence value, wherein the second sensor captures the second sensor data subsequent to the first sensor capturing the first sensor data.

14. An electronic device, comprising:

at least one memory storing computer-executable instructions; and at least one processor operatively coupled to the at least one memory, wherein the at least one processor is configured to execute the computer-executable instructions to:

determine first sensor data captured by a first sensor during a first period of time determine that the first sensor data indicates occurrence of an event;

activate a second sensor, wherein activating the second sensor includes providing provide power to the second sensor during a second period of time;

determine second sensor data captured by the second sensor during the second period of time, wherein the second period of time starts subsequent to a beginning of the first period of time;

determine a first sensor data signature comprising at least a portion of the first sensor data and at least a portion of the second sensor data;

determine that the first sensor data signature is within a threshold tolerance of a second sensor data signature, wherein the second sensor data signature comprises data captured by at least one of the first sensor or the second sensor prior to the first period of time; and cause the electronic device to transition from a first state to a second state that is different from the first state based at least in part on the determining that the first sensor data signature is within the threshold tolerance of the second sensor data signature.

15. The electronic device of claim 14, wherein a display is powered off when the electronic device is in the first state, and wherein the display is powered on when the electronic device is in the second state.

16. The electronic device of claim 14, wherein the at least one processor is further configured to:

apply a first weight, based at least in part on a first location of the electronic device, to the first sensor data and a second weight, based at least in part on a second, different location of the electronic device, to the second sensor data;

wherein the at least a portion of the first sensor data is weighted according to the first weight, and wherein the at least a portion of the second sensor data is weighted according to the second weight.

17. The electronic device of claim 16, wherein the first weight is based on an assessment of the first sensor operating within a detection region in which the electronic device is located.

18. The electronic device of claim 17, wherein the assessment is based at least in part on one or more of: a physical address associated with the electronic device, or a GPS location of the electronic device.

19. The electronic device of claim 16, wherein at least one of the first weight or the second weight is based at least in part on an assessment of a structure within which the electronic device is located.

20. The electronic device of claim 16, wherein at least one of the first weight or the second weight is based at least in part on historical sensor data captured by the first sensor and by the second sensor within a detection region in which the electronic device is located.

* * * * *